United States Patent
Cassezza

(10) Patent No.: US 9,501,178 B1
(45) Date of Patent: Nov. 22, 2016

(54) GENERATING AUDIBLE TOOLTIPS

(75) Inventor: Jason T. Cassezza, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/501,893

(22) Filed: Feb. 10, 2000

(51) Int. Cl.
*G06F 3/045* (2006.01)
*G06F 3/044* (2006.01)
*G06F 3/041* (2006.01)

(52) U.S. Cl.
CPC .............. *G06F 3/044* (2013.01); *G06F 3/041* (2013.01)

(58) Field of Classification Search
CPC .... G06F 3/041; G06F 3/0421; G06F 3/0428; G06F 3/042; G06F 3/044
USPC ........ 345/156–160, 173–178, 711, 709, 727, 345/804; 340/988, 990, 995; 178/18.01–18.09, 20.01–20.04
See application file for complete search history.

(56) References Cited

U.S. PATENT DOCUMENTS

| | | | | |
|---|---|---|---|---|
| 5,485,176 A | * | 1/1996 | Ohara et al. | 345/173 |
| 5,604,517 A | * | 2/1997 | Filo | 345/173 |
| 5,657,462 A | * | 8/1997 | Brouwer et al. | 345/709 |
| 5,757,359 A | * | 5/1998 | Morimoto et al. | 345/173 |
| 5,864,815 A | * | 1/1999 | Rozak et al. | 704/275 |
| 5,877,751 A | * | 3/1999 | Kanemitsu et al. | 345/178 |
| 5,995,101 A | * | 11/1999 | Clark et al. | 345/711 |
| 6,040,824 A | * | 3/2000 | Maekawa et al. | 344/173 |
| 6,119,033 A | * | 9/2000 | Spigelman et al. | 600/426 |
| 6,396,477 B1 | * | 5/2002 | Hinckley | G06F 3/0202 345/163 |
| 6,456,275 B1 | * | 9/2002 | Hinckley et al. | 345/156 |
| 6,559,830 B1 | * | 5/2003 | Hinckley | G06F 3/0202 345/156 |
| 6,784,902 B1 | * | 8/2004 | Melder | G06F 8/34 715/771 |
| 7,091,959 B1 | * | 8/2006 | Clary | 345/173 |
| 7,358,956 B2 | * | 4/2008 | Hinckley | A63F 13/06 345/156 |
| 2001/0011995 A1 | * | 8/2001 | Hinckley | A63F 13/06 345/156 |
| 2003/0028380 A1 | * | 2/2003 | Freeland et al. | 704/260 |
| 2004/0008222 A1 | * | 1/2004 | Hovatter | G06F 3/0481 715/749 |
| 2014/0281997 A1 | * | 9/2014 | Fleizach | G06F 3/167 715/720 |

* cited by examiner

*Primary Examiner* — Vijay Shankar
(74) *Attorney, Agent, or Firm* — Trop Pruner & Hu, P.C.

(57) ABSTRACT

A processor-based system may include software which implements an audible tooltip. For example, in connection with a touch screen display, when an object is contacting or proximate to a given button displayed on the display, both an audible tooltip and a textual tooltip may be provided to give the user information about the functionality of the particular button. In some embodiments of the present invention, this enables the user to operate a touch screen display without actually looking at the display.

12 Claims, 3 Drawing Sheets

GENERATING AUDIBLE TOOLTIPS

BACKGROUND

This invention relates generally to using processor-based systems and particularly to said systems which use touch screens.

Touch screens are display screens which display information associated with processor-based systems. They receive inputs in the form of contact or near contact between the user's finger or a stylus and the screen. Sensing elements, such as capacitance sensors, inside the screen, detect the contact or near contact by the object and provide a selection signal. Thus, when the user's finger, in one example, is proximate to a given icon displayed on the display screen, that icon may be thereby selected. In response, a processor-based system may take action in accordance with the user selection.

A number of different processor-based systems use touch screens including handheld processor-based systems, personal digital assistants, and any other processor-based system. Such a system provides a highly interactive arrangement with a reduced need for input devices to provide information for making user selections.

One potential application of a touch screen is in connection with an in car personal computer. In car personal computers provide conventional computer functions as well as functions particularly directed to the vehicle application. For example, the in car personal computer may provide a navigation or mapping function, may control connected appliances such as a cellular telephone, or a sound system, as examples.

One problem is that it is generally considered to be undesirable for the driver, when operating the vehicle, to look away from the road to view information on a display screen. To this end, voice control systems have been developed. However, voice control systems have a number of shortcomings. For example, they may imperfectly respond to any given user's voice. Moreover, they may be prone to errors when different drivers operate the same vehicle.

Thus, there is a need for better ways to interact with processor-based systems with touch screen displays.

SUMMARY

In accordance with one aspect, a method includes detecting when an object is proximate to an item displayed on a display screen for a processor-based system. An audible tooltip is generated in response to the detection that the object is proximate to the item.

Other aspects are set forth in the accompanying detailed description and claims.

DETAILED DESCRIPTION

Figure 1:
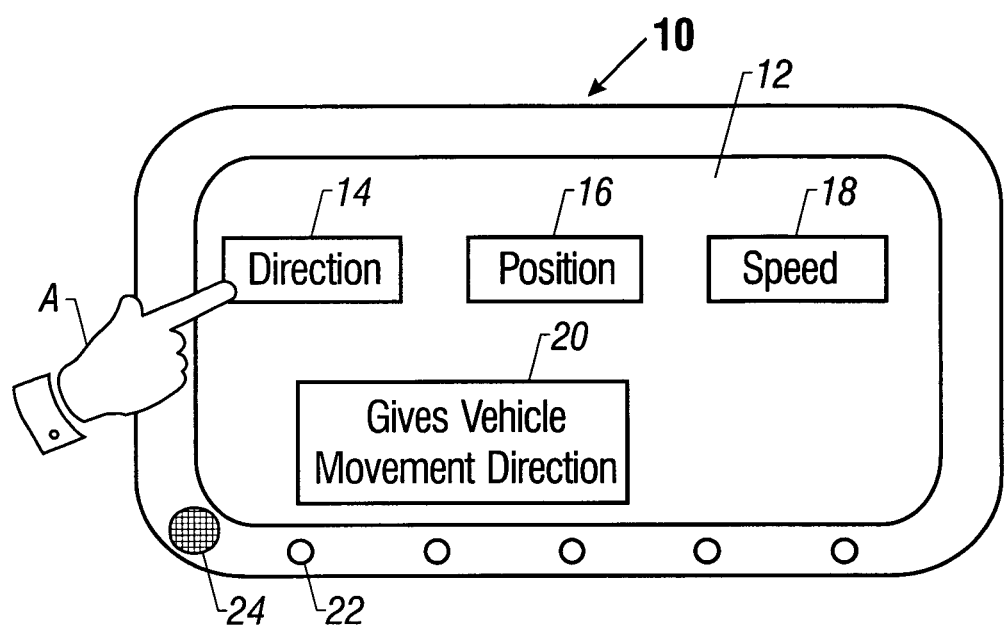
FIG. 1 is a front elevational view of one embodiment of a processor-based system in accordance with the present invention.

Referring to FIG. 1, a processor-based system 10 may include a display 12, a plurality of input controls 22 and a speaker 24, in accordance with one embodiment of the present invention. The embodiment illustrated in FIG. 1 is an in car personal computer system. However, the present application is useful in connection with a wide range of processor-based systems including desktop computers, laptop computers, handheld computers, appliances, and the like.

The display 12 is a touch screen display which is responsive to contact or near contact by an object such as the user's finger or a stylus. The touch screen 12 may use conventional technology to display information such as the icons 14, 16 and 18, and at the same time to detect contact (or near contact) with an object such as the user's finger indicated as A in FIG. 1. In response to contact or near contact, the user selectable icons 14, 16 or 18 may be selected enabling the processor-based system 10 to respond. For example, touch screens may utilize relatively transparent capacitive elements which capacitively detect the presence of the user's finger in proximity to one or more of the user selectable buttons or icons 14, 16 or 18.

In accordance with one embodiment of the present invention in which the processor-based system 10 is an in car personal computer system, the system 10 may implement a navigation function which may include a mapping feature. The mapping feature may, for example, display the vehicle on a map including its direction, its position on the map, and its speed. The user, while operating the vehicle, may touch the screen and may receive information about which button or icon the user's finger is proximate to. For example, when the user's finger A is proximate to the direction button 14, the processor-based system 10 may provide an audible tooltip which indicates the function of the button contacted by the user's fingers. In addition, a textual tooltip 22 may be provided at the same time.

As used herein, a tooltip is an explanatory message that is generated when the user moves a cursor over a button on a toolbar. The cursor may be a conventional mouse cursor controlled by a mouse or other pointing device or it may be an object contacting or nearly contacting a touch screen. Tooltips are attractive because they provide additional information about a given object without cluttering the display with too much data.

Generally, tooltips are implemented in a hypertext markup language (HTML) using the DIV element. A tooltip may be defined by an identifier (ID) which is the value of the DIV elements ID attribute, a width that is the width of the tooltip box, and a code that is the information that is to be provided in response to the activation of the tooltip button. The information displayed may be in the form of text as indicated at 20 in FIG. 1 or, in accordance with the present invention, may be in the form of audible information provided over the speaker 24.

In this way, the user may obtain information about the operation of various buttons displayed in connection with a graphical user interface without looking directly at the processor-based system 10. This may be useful in a number of applications in addition to the in car personal computer system. For example, in a number of cases, the display may be relatively small and may be difficult to both contact selections and to view them. This may be the case for example in connection with appliances such as cellular telephones. In other cases, it may be desirable to operate the processor-based system 10 in a position which is not amenable to user viewing of the display screen. Again, this may be the case in connection with cellular telephone displays.

The operation of dynamic tooltips is explained, for example, at http://www.webreference.com/jf/column16/index.html. Tooltips are displayed and hidden by connecting them to a standard event handler. For example, conventional tooltips may be connected to the event handlers onMouseOver and onMouseOut. Once a tooltip is active, an Internet browser keeps track of mouse movements. Only after the mouse has not moved for a given period of time, is the corresponding tooltip displayed. Likewise, in connection with a system using a touch screen, the same functionality may be implemented through the interaction between the user controlled object and the touch screen. When the user removes the contact with the link, the event handler clears the tooltip function. Commonly, tooltips are placed in the main script at the end of an HTML document.

When the user moves an object over the link, an event occurs followed by an onMouseOver event. In the case where the user moves the object over the tooltip enabled link, but stops there, a functional is called. The function first checks to see if a timer variable is null and clears the current time out if any. The function instructs the browser to call the tooltip function after a given time, for example, 300 milliseconds. The active tooltip may then be displayed and an audible version may be provided as well. In the meantime, if the user moves the object, the event handler invokes the function again, clears the current time out, and installs a new timeout, restarting the time out period.

Figure 2:
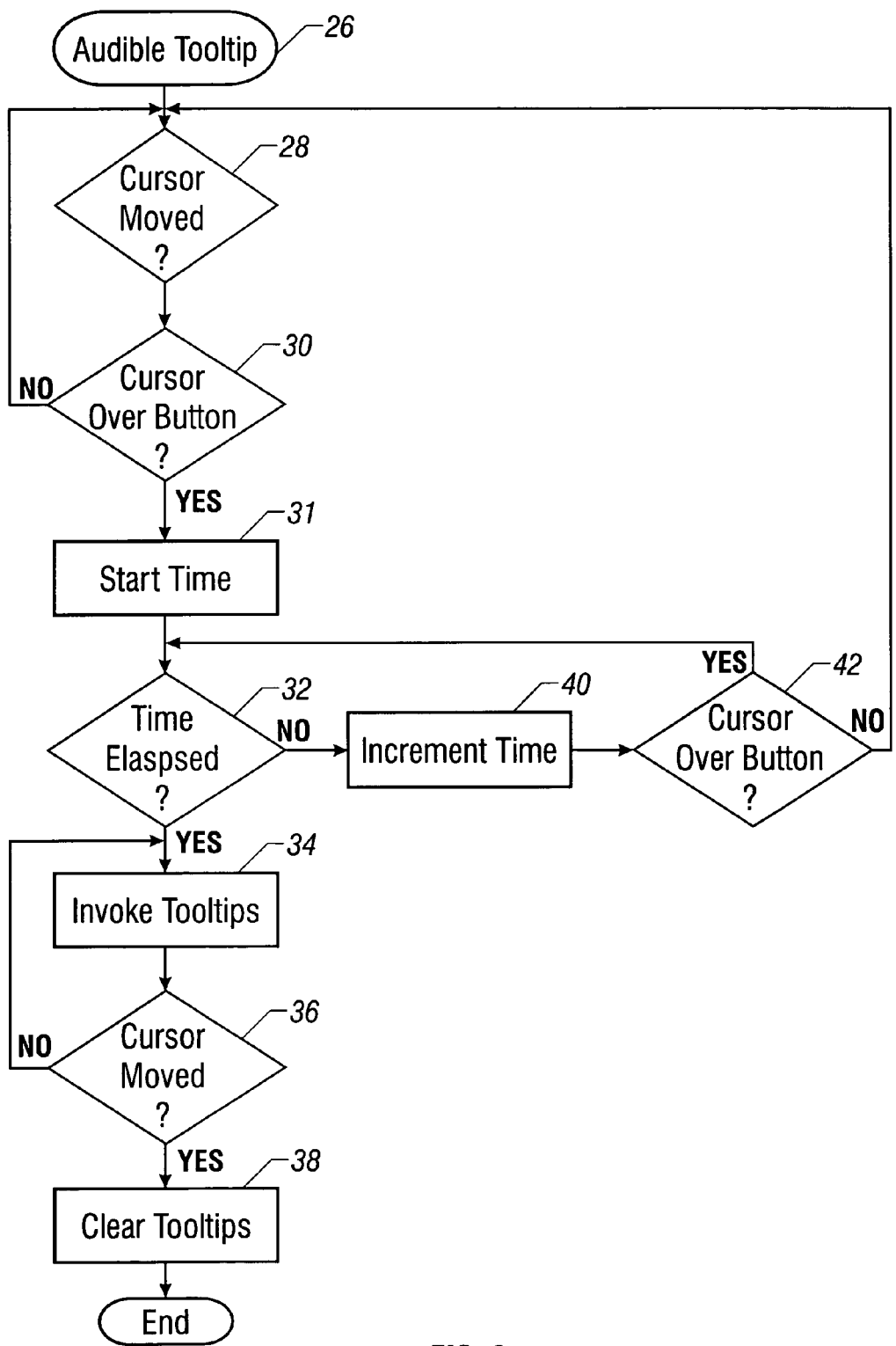
FIG. 2 is a flow chart for software for implementing one embodiment of the present invention.

Referring to FIG. 2, the audible tooltip software 26 begins by determining whether the cursor has moved as indicated in diamond 28. For present purposes, the term cursor is utilized to refer to any selector utilized by a pointing device including a mouse, a touch screen, or any other device.

If the cursor is over a user selectable button as indicated in diamond 30, a timer time is started as indicated in block 31. Next, a check at diamond 32 determines whether a predetermined time period has elapsed. If so, the tooltips are invoked as shown in block 34. The tooltips include both the textual tool tip and the audio tool tip.

A check at diamond 36 determines whether the cursor has moved. If so, the tooltips are cleared as indicated in block 38.

If the check at diamond 32 indicates that the time is not elapsed, the time is incremented as indicated in block 40. Thereafter, a check at diamond 42 determines whether or not the cursor is still over the button. If not, the flow recycles to the beginning. Otherwise, the flow cycles back through diamond 32 to determine if the time has elapsed.

Figure 3:
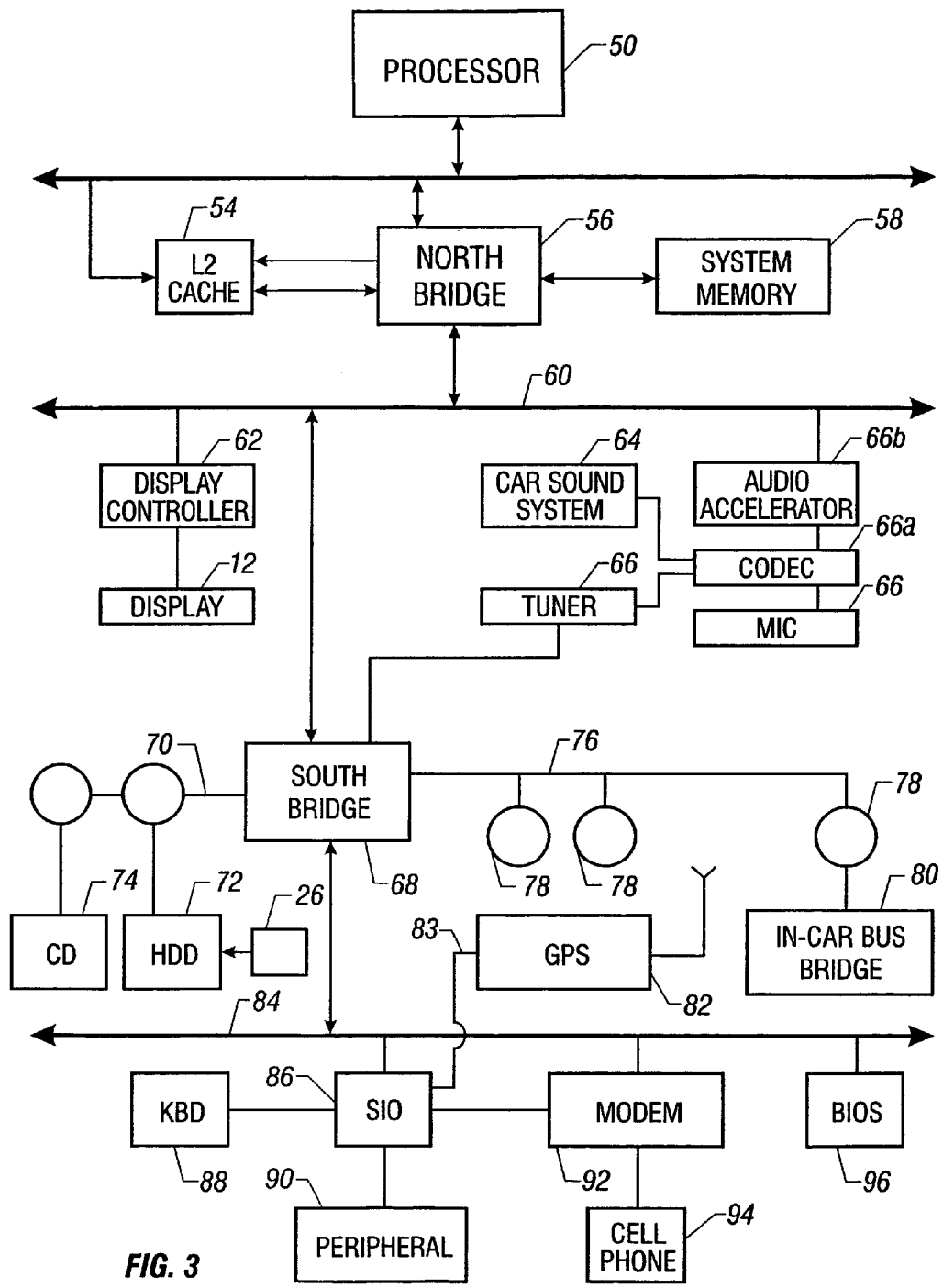
FIG. 3 is a block diagram of hardware for implementing one embodiment of the present invention.

One embodiment of a processor-based system for implementing the capabilities previously described on a vehicle may use a processor-based system located in the vehicle's dashboard. The system illustrated in FIG. 3 may be implemented, for example, by the Intel 82430PX PCI chipset. Other chipsets may be used as well.

The processor 50 communicates across a host bus 52 to a bridge 56, an L2 cache 54, and system memory 58. The bridge 56 may communicate with a bus 60, which could, for example, be a Peripheral Component Interconnect (PCI) bus in accordance with the Revision 2.1 of the PCI Electrical Specification available from the PCI Special Interest Group, Portland, Oreg. 97214. The bus 60 in turn may be coupled to a display controller 62, which may drive the display 12, in one embodiment of the invention.

A microphone input 66 may feed the audio codec (AC'97) 66a, where it may be digitized and sent to memory through the audio accelerator 66b. The AC'97 Specification is available from Intel Corporation (www.developer.intel.com/pc/supp/platform/ac97). A tuner 66 may be controlled from a bridge 68. The output of the tuner may be sent to system memory 58 or mixed in the codec and sent to the car sound system 64. A speaker in the car sound system may be utilized to implement the speaker 24. Sounds generated by the processor 50 may be sent through the audio accelerator 66b and the AC'97 codec 66a to the car sound system 64. In one embodiment of the present invention the audible tooltip is implemented by a digitally generated voice.

The bus 60 may be coupled to a bridge 68 which in turn may have an extended integrated drive electronics (EIDE) coupling 70 and a Universal Serial Bus (USB) coupling 76 (i.e., a device compliant with the Universal Serial Bus Implementers Forum Specification, Version 1.0 (www.usb.org)). Finally, the USB connection 76 may couple to a series of USB hubs 78. One of these hubs may couple to an in-car bus bridge 80 as illustrated. The in-car bus bridge 80 may, for example, use the controller area network (CAN) protocol or the Society of Automotive Engineers J1815 Standard. The in-car bus provides communication between microcontrollers that control vehicle operation. The other hubs may be available for implementing additional functionality.

The EIDE connection 70 may couple to a hard disk drive 72 and a compact disk player 74. In some systems, it may be desirable to replace the hard disk drive with other memory forms. For example, a flash memory may be used in place of the drive 72. The memory may be implemented, for example, by a 28F202 megabyte flash memory available from Intel Corporation.

The bridge 68 in turn may be coupled to an additional bus 84, which may couple to a serial interface 86, which drives a peripheral 90, a keyboard 88, a modem 92 coupled to a cellular telephone 94, and a basic input/output system (BIOS) memory 96. A global positioning receiver 82 may be attached by a cable 83 to a serial port on a serial I/O device 86 attached to the bus 84.

The USB hubs may be implemented by 8093HX microcontrollers available from Intel Corporation. Local firmware may be stored on EPROM memory (e.g., the 27C256 EPROM available from Intel Corporation).

The software 26 may be part of an application program stored on the hard disk drive 72 as indicated. Alternatively, the software 26 may be part of an operating system, an Internet browser, or a plug-in for an Internet browser or an operating system.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
   a processor;
   a touch screen; and
   a storage storing instructions that cause a processor to detect when an object is proximate to a user activated icon displayed on said touch screen and generate an audible tooltip in response to the detection that the object is proximate to the icon, said tooltip generating audio data about the function of the icon.

2. The system of claim 1 wherein said storage stores instructions that causes the processor to generate a voice-based tooltip.

3. The system of claim 1 wherein said system is an in car personal computer system.

4. The system of claim 3 wherein said storage stores instructions that detects when the user's finger is proximate to a button image displayed on said touch screen.

5. The system of claim 1 wherein said storage stores instructions to generate both a textual and an audible tooltip.

6. A method comprising:
  detecting when an object is proximate to a user activated icon displayed on a touch display screen for a processor-based system; and
  generating an audible tooltip in response to detection that the object is proximate to said icon, said tooltip generating audio data about the function of the icon.

7. The method of claim 6 wherein generating an audible tooltip includes generating a voice-based tooltip.

8. The method of claim 7 further including generating both a textual and an audible tooltip.

9. The method of claim 7 including providing a tooltip for button images provided on a display.

10. The method of claim 7 including detecting when the user's finger is proximate to an item displayed on a touch screen display.

11. The method of claim 6 including providing voice information to the operator of a vehicle about images proximate to the operator's finger.

12. The method of claim 11 including providing an in car computer system with a touch screen display.

\* \* \* \* \*